(12) United States Patent
Daunas et al.

(10) Patent No.: US 9,464,615 B2
(45) Date of Patent: Oct. 11, 2016

(54) METHOD FOR USING THE START-UP DEVICE OF A MOTOR VEHICLE ENGINE

(75) Inventors: Olivier Daunas, Cergy (FR); Philippe Bastiani, Poissy (FR)

(73) Assignee: Peugeot Citroën Automobile SA, Velizy Villacoublay (FR)

(*) Notice: Subject to any disclaimer, the term of this patent is extended or adjusted under 35 U.S.C. 154(b) by 532 days.

(21) Appl. No.: 13/824,541

(22) PCT Filed: Sep. 22, 2011

(86) PCT No.: PCT/FR2011/052189
§ 371 (c)(1),
(2), (4) Date: Mar. 18, 2013

(87) PCT Pub. No.: WO2012/052644
PCT Pub. Date: Apr. 26, 2012

(65) Prior Publication Data
US 2013/0191013 A1    Jul. 25, 2013

(30) Foreign Application Priority Data
Oct. 19, 2010    (FR) ...................................... 10 58501

(51) Int. Cl.
*F02N 11/10* (2006.01)
*F02N 11/08* (2006.01)
(Continued)

(52) U.S. Cl.
CPC .............. *F02N 19/00* (2013.01); *B60L 11/005* (2013.01); *B60L 11/14* (2013.01); *B60L 11/1859* (2013.01);
(Continued)

(58) Field of Classification Search
CPC .. B60L 11/005; B60L 11/1859; B60L 11/14; B60L 2220/20; B60L 2240/445; B60L 2240/545; F02N 11/0866; F02N 19/00; F02N 11/10; F02N 2011/0877; F02N 2011/0885; F02N 2200/023; F02N 2200/046; F02N 2200/061; F02N 2200/064; F02N 2250/02; F02N 2300/304; H02J 7/345; Y02T 10/70; Y02T 10/7005; Y02T 10/7022; Y02T 10/705; Y02T 10/7077
USPC ................ 123/179.4, 366, 406.53, 685, 491, 123/179.1, 179.3, 179.25
See application file for complete search history.

(56) References Cited

U.S. PATENT DOCUMENTS 5,563,454 A * 10/1996 Araki ................... F02N 11/0866
  123/179.1
5,642,696 A *  7/1997 Matsui ........................ 123/179.1
(Continued)

FOREIGN PATENT DOCUMENTS

| DE | EP 1564403 A2 * | 8/2005 | ............ B60W 10/06 |
| EP | 0392698 A1 | 10/1990 | |

(Continued)

OTHER PUBLICATIONS

International Search from corresponding International Application No. PCT/FR2011/052189 mailed Jun. 28, 2012.

*Primary Examiner* — Hung Q Nguyen
*Assistant Examiner* — Brian P Monahon
(74) *Attorney, Agent, or Firm* — Polster, Lieder, Woodruff & Lucchesi, LC

(57) ABSTRACT

The invention relates to a method for using a device for starting a heat engine of a motor vehicle. The method comprises a step in which a theoretical hold time $T_t$ is determined by a monitoring computer (101).

5 Claims, 1 Drawing Sheet

(51) Int. Cl.
*F02N 19/00* (2010.01)
*B60L 11/00* (2006.01)
*B60L 11/14* (2006.01)
*B60L 11/18* (2006.01)
*H02J 7/34* (2006.01)

(52) U.S. Cl.
CPC ........... *F02N 11/0866* (2013.01); *H02J 7/345* (2013.01); *B60L 2220/20* (2013.01); *B60L 2240/445* (2013.01); *B60L 2240/545* (2013.01); *F02N 11/10* (2013.01); *F02N 2011/0877* (2013.01); *F02N 2011/0885* (2013.01); *F02N 2200/023* (2013.01); *F02N 2200/046* (2013.01); *F02N 2200/061* (2013.01); *F02N 2200/064* (2013.01); *F02N 2250/02* (2013.01); *F02N 2300/304* (2013.01); *Y02T 10/70* (2013.01); *Y02T 10/705* (2013.01); *Y02T 10/7005* (2013.01); *Y02T 10/7022* (2013.01); *Y02T 10/7077* (2013.01)

(56) References Cited

U.S. PATENT DOCUMENTS

| | | | |
|---|---|---|---|
| 6,202,615 B1 * | 3/2001 | Pels | F02N 11/0866 123/179.21 |
| 6,325,035 B1 * | 12/2001 | Codina et al. | 123/179.1 |
| 6,701,880 B1 | 3/2004 | Gauthier | |
| 6,988,475 B2 * | 1/2006 | Burke | 123/179.28 |
| 7,525,287 B2 * | 4/2009 | Miyashita | H01M 2/1072 123/179.1 |
| 8,276,559 B2 * | 10/2012 | Holz et al. | 123/179.3 |
| 2002/0020381 A1 * | 2/2002 | Pels | F02N 11/0862 123/179.3 |
| 2004/0041403 A1 | 3/2004 | Fattic | |
| 2007/0113814 A1 | 5/2007 | Tamai et al. | |
| 2008/0246443 A1 * | 10/2008 | Doljack | F02N 11/0866 320/167 |
| 2008/0276892 A1 * | 11/2008 | Doljack | F02N 11/0866 123/179.28 |
| 2009/0108803 A1 | 4/2009 | Singarajan et al. | |
| 2009/0315518 A1 * | 12/2009 | Soma et al. | 320/134 |
| 2009/0322101 A1 * | 12/2009 | Reynolds | F02N 11/0866 290/38 R |
| 2010/0244459 A1 * | 9/2010 | Gibson | F02N 11/0866 290/38 R |

FOREIGN PATENT DOCUMENTS

| | | |
|---|---|---|
| EP | 0403051 A1 | 12/1990 |
| EP | 1369285 A1 | 12/2003 |
| EP | 1564403 A2 * | 8/2005 |
| FR | 2912190 A1 * | 8/2008 |
| FR | 2935156 A1 | 2/2010 |

* cited by examiner

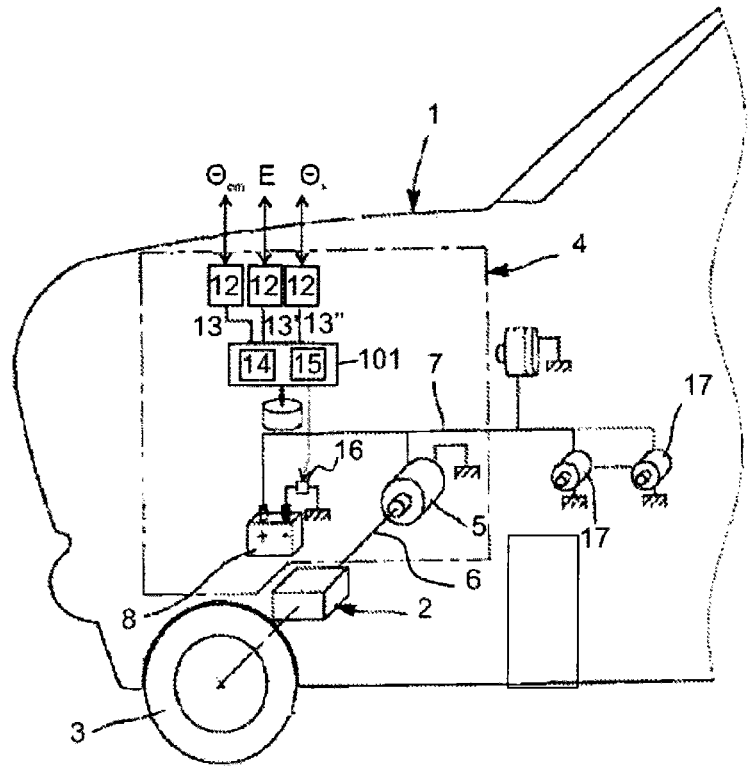
Fig.1
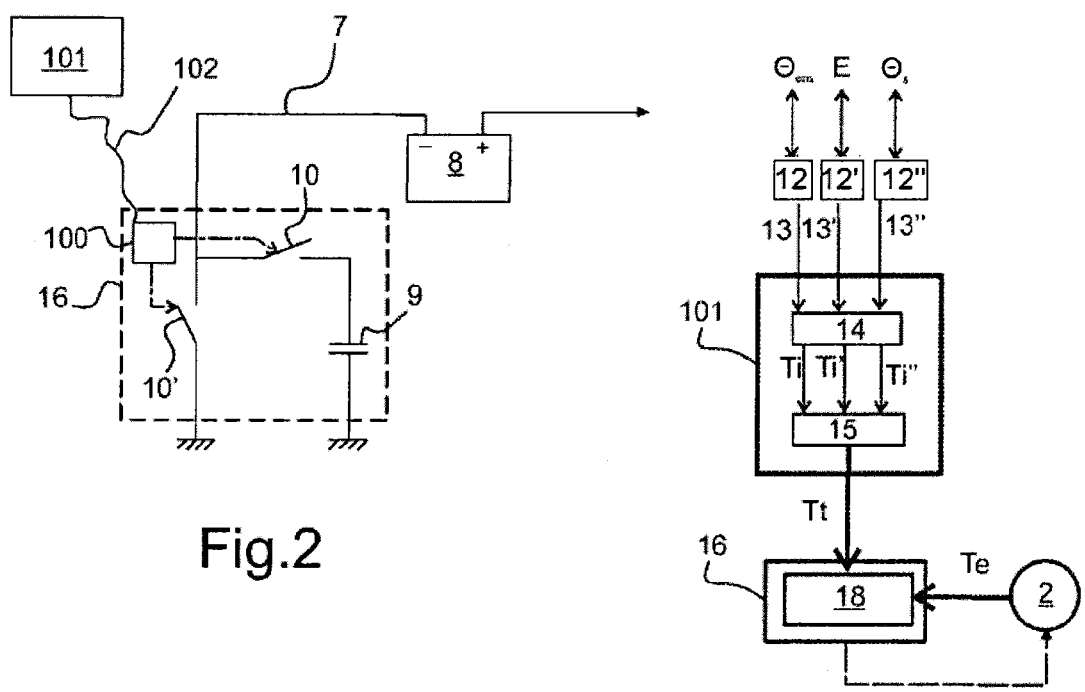
Fig.2
Fig.3

METHOD FOR USING THE START-UP DEVICE OF A MOTOR VEHICLE ENGINE

CROSS-REFERENCE TO RELATED APPLICATIONS

The present invention is the US National Stage under 35 U.S.C. §371 of International App. No. PCT/FR2011/052189 which was filed on Sep. 22, 2011 and which claims the priority to French patent application 1058501 filed on Oct. 19, 2010, the contents of which (text, drawings and claims) are incorporated herein by reference.

BACKGROUND

The invention belongs to the field of methods and devices for starting a motor vehicle engine as well as the start-up means or accessories for such an engine. The invention relates to a method for using a start-up device for the engine. It also relates to a monitoring computer for implementing the method. The invention also relates to a centralized voltage-holding device for implementing the method. Finally, it relates to a start-up device including such a monitoring computer and such a centralized voltage-holding device.

A motor vehicle equipped with an internal combustion engine is provided with a start-up device for starting the internal combustion engine.

The start-up device includes an electric power supply system positioned between the internal combustion engine and an electric power supply source, such as a battery. The electric power supply system comprises, in particular, an electric starter, which provides torque to the internal combustion engine in order to start the engine.

The start-up device includes a known element called a "Stop & Start" system. The "Start & Stop" system enables the internal combustion engine to be shut down, at the driver's request, when the traveling speed of the vehicle is zero or nearly zero, e.g., when stopped at a red light, upon approaching a yield sign or any other comparable situation, the internal combustion engine subsequently being automatically restarted when a user of the motor vehicle once again activates the internal combustion engine. This has the advantage of reducing the fuel consumption of the motor vehicle as well as the pollution produced by the vehicle.

The start-up device includes a centralized voltage-holding device commonly called a "DMTC", which is intended to maintain the electric power supply system/network at a sufficiently high voltage level. These arrangements enable accessories of the motor vehicle to be satisfactorily turned on, such as an air-conditioning system, car radio or satellite positioning device, for example. The centralized voltage-holding device is also intended to provide a "Boost" effect to the internal combustion engine by increasing the torque supplied to the internal combustion engine. Reference can be made, for example, to FR 2,935,156 (PEUGEOT CITROEN AUTOMOBILES SA), which describes a start-up device of the aforesaid type.

Such a start-up device warrants improvement in order to prevent premature wear and tear of the electric starter when same is subjected to a high-intensity electric current, in particular during a "Boost" effect.

On the other hand, such a start-up device warrants improvement in order to be more efficient under certain operating conditions, in particular that in which the start-up device is subjected to a considerable under voltage.

Finally, such a start-up device warrants improvement in order to be more operational under certain operating conditions, in particular that in which the internal combustion engine is difficult to start, e.g., in the case of a very low outside temperature, lower than −10° C., for example, and/or in the case of high humidity, e.g., higher than 80%.

Finally, such a start-up device and/or a method for using such a start-up device warrant being improved such that the performance of the electric power supply system is optimized and potential wear and tear of the parts comprising the electric power supply system is minimized.

SUMMARY

A general object of the present invention is to supply additional power to the internal combustion engine during a start-up phase thereof in order to achieve chosen torque objectives, while at the same time taking account of the durability constraints of electric devices with which the motor vehicle is equipped, such as a starter or the like. Another general object of the present invention is to prevent under voltages during the start-up phase, so as to protect against any risk of the electric devices being set to zero.

Specifically, a first particular object of the present invention is to propose a method for using a start-up device for a motor vehicle internal combustion engine, which enables the on-board power supply system/network to be maintained at an optimized level of quality, e.g., by preventing untimely zeroing and/or resetting of the components of the power supply system/network, and which limits potential wear and tear of parts comprising the electric power supply system/network, in order to strengthen the durability of the system/network. The second particular object of the present invention is to propose such a method which optimizes use of the start-up device for the engine under relatively any operating condition. A third particular object of the present invention is to obtain such results using a start-up method and device which are relatively easy to use and/or manufacture.

A method of the present invention is a method for using a start-up device for a motor vehicle internal combustion engine.

According to the present invention, the method includes a step in which a theoretical hold time $T_t$ is determined by a monitoring computer.

According to a preferred embodiment, which is advantageously implemented for a common use of the present invention, the determination step is a step for calculating the theoretical hold time $T_t$ as a function of at least one of the separate parameters including:
- an engine water temperature $\theta_{em}$,
- a state of charge E of an electric power supply source for the internal combustion engine, and
- a temperature $\theta_s$ of the electric power supply source for the internal combustion engine.

The step for calculating the theoretical hold time $T_t$ advantageously includes:
- a first phase for calculating a first intermediate hold time $T_i$ as a function of the temperature $\theta_{em}$ of the engine water,
- a second phase for calculating a second intermediate hold time $T_{i'}$ as a function of the state of charge E of the electrical power supply source for the internal combustion engine, and
- a third phase for calculating a third intermediate hold time $T_{i''}$ as a function of the temperature $\theta_s$ of the electrical power supply source for the internal combustion engine.

The step for calculating the theoretical hold time $T_t$ advantageously includes a step for comparing the intermediate hold times $T_i$, $T_{i'}$, $T_{i''}$ in order to identify the longest intermediate hold time, which constitutes the theoretical hold time $T_t$.

The method advantageously includes an additional step during which the theoretical hold time $T_t$ is compared to an actual hold time $T_e$, which is measured by a centralized voltage-holding device.

The method advantageously includes a final step during which:

the hold is authorized if and only if the actual hold time $T_e$ is less than the theoretical hold time $T_t$; and the hold is prohibited if and only if the actual hold time $T_e$ is greater than or equal to the theoretical hold time $T_t$.

According to a non-preferred embodiment, which is advantageously implemented for use of the present invention under exceptional conditions, the theoretical hold time $T_t$ is constant.

A monitoring computer of the present invention is primarily identifiable in that the monitoring computer includes instructions for carrying out such a method.

A centralized voltage-holding device of the present invention is primarily identifiable in that the centralized voltage-holding device includes instructions for carrying out such a method.

A start-up device of the present invention is primarily identifiable in that the start-up device includes such a monitoring computer and such a centralized voltage-holding device.

BRIEF DESCRIPTION OF THE DRAWINGS

Other features and advantages of the present invention will become apparent upon reading the following description of exemplary embodiments, in connection with the figures of the appended drawing sheet, in which:

FIG. 1 is a schematic view of a motor vehicle equipped with a start-up device for an internal combustion engine.

FIG. 2 is a partial schematic view of the start-up device shown in the preceding figure.

FIG. 3 is a schematic illustration of a method for implementing the start-up device shown in the preceding figures.

DETAILED DESCRIPTION

In FIG. 1, a motor vehicle 1 is equipped with an internal combustion engine 2. The latter, for example, is an internal combustion engine capable of driving drive wheels 3 of the motor vehicle 1. The internal combustion engine 2 is capable of being a hybrid engine without departing from the principles of the present invention. The motor vehicle 1 is equipped with a start-up device 4 for the internal combustion engine 2.

The start-up device 4 includes an electric starter 5 capable of rotating a drive shaft 6 of the internal combustion engine 2 in order to activate the starting of the engine.

The start-up device 4 also includes an electric power supply network 7 positioned between the electric starter 5 and an electric power supply source 8, such as an electrochemical battery.

With reference to FIG. 2, the start-up device 4 includes a set of supercapacitors 9, which are connected to the electric power supply network 7 by means of a first controlled relay 10, such as one or more MOS transistors mounted in parallel to one another or the like. When in an open position, the first controlled relay 10 isolates the set of supercapacitors 9, whereas, when in closed position, the first controlled relay 10 connects the set of supercapacitors 9 in series to the electric power supply source 8. The set of supercapacitors 9 forms an energy storage device capable of being called upon to support the electric power supply source 8 during a first startup of the internal combustion engine 2 or during a restart thereof. The set of supercapacitors 9 comprises, in particular, of a plurality of capacitors connected in series to one another.

The start-up device 4 likewise includes a control unit 100 for the first controlled relay 10. The control unit 100 is a constituent part of a centralized voltage-holding device 16 commonly called a "DMTC", which is intended to maintain the electric power supply network 7 at a sufficiently high voltage level. The control unit 100 is associated with a monitoring computer 101 by means of a LIN bus 102 or the like.

With reference to FIG. 3, the monitoring computer 101 is connected to a plurality of sensors 12, 12', 12" for data 13, 13', 13" relating to a state of respective parameters of the motor vehicle 1. A first sensor 12 is specifically intended to measure a first data item 13 relating to an engine water temperature $\theta_{em}$. Again specifically, a second sensor 12' is intended to measure a second data item 13' relating to a state of charge E of the electric power supply source 8. Finally, a third sensor 12" is specifically intended to measure a third data item 13" relating to a temperature $\theta_s$ of the electric power supply source 8.

The devices 12, 12', 12" for capturing data 13, 13', 13" create a map that reveals the state of the vehicle. Thus, from the first data item 13 relating to the engine water temperature $\theta_{em}$, it appears that the colder the engine water temperature $\theta_{em}$, the more difficult the internal combustion engine 2 is to start. From the second data item 13' relating to the state of charge E of the electric power supply source 8, it appears that the lower the state of charge E, the less capable the electric power supply source 8 is of supplying electric power sufficient to provide satisfactory torque, which has an overall adverse effect on the performance of the electric power supply network 7. From the third data item 13" relating to the temperature $\theta_s$ of the electric power supply source 8, it appears that the lower the temperature $\theta_s$ of the electric power supply source 8, the greater the internal resistance thereof, which is a disadvantage with respect to providing satisfactory torque and which has an overall adverse effect on the performance of the electric power supply network 7.

The present invention advantageously proposes to determine the value of a hold time during which the set of supercapacitors 9 is placed in series with the electric power supply source 8. Specifically, in a first operating mode of the vehicle, referred to as the normal mode, the present invention proposes to calculate the hold time as a function of a certain number of parameters. Again specifically, in a second operating mode of the vehicle, referred to as the degraded mode, the present invention proposes to randomly determine the hold time.

According to the first mode, for each data item 13, 13', 13", a respective intermediate hold time $T_i$, $T_{i'}$, $T_{i''}$ is calculated by means of calculating means 14 that are constituent parts of the monitoring computer 101. Specifically, the calculating means 14 determines a first intermediate hold time $T_i$ from the first data item 13. In the same way, the calculating means 14 determines a second intermediate hold time $T_{i'}$ from the second data item 13'. Finally, the calculating means 14 determines a third intermediate hold time $T_{i''}$ from the third data item 13".

The monitoring computer 101 likewise comprises comparison means 15, which is capable of comparing the intermediate hold times $T_i$, $T_{i'}$, $T_{i''}$ to one another and of identifying the longest one thereof, which ultimately constitutes a theoretical hold time $T_t$. The theoretical hold time $T_t$ is transmitted by the monitoring computer 101 to the control unit 100 of the centralized voltage-holding device 16 by means of the LIN bus 102.

The control unit 100 receives the information relating to the theoretical hold time $T_t$ as well as authorization to implement if an under voltage is detected. The information and the authorization are transmitted from the monitoring computer 101 to the control unit 100. The control unit 100 is capable of placing the first controlled relay 10 in closed position while a second controlled relay 10', arranged in parallel with the first controlled relay 10 and the set of supercapacitors 9, is placed in open position. These arrangements enable accessories 17 of the motor vehicle 1, such as an air-conditioning system car radio or satellite positioning device, for example, to be satisfactorily turned on. The centralized voltage-holding device 16 is also capable of providing a "Boost" effect to the internal combustion engine 2 by increasing the torque supplied to the internal combustion engine 2. In other words, the first controlled relay 10 switches if and only if there is proven to be an under voltage and the authorization to implement is positive.

Since the hold obtained by the centralized voltage-holding device 16 is not required during the entire start-up phase, the present invention proposes to activate the centralized voltage-holding device 16 during the minimum necessary theoretical hold time $T_t$ that was calculated from the data 13, 13', 13" revealing the state of the vehicle. This results in an optimized use of the centralized voltage-holding device 16 for improving the mechanical performance of the electric power supply network 7 and for limiting potential wear and tear of the parts comprising the electric power supply network 7, and, in particular, the electric starter 5. To accomplish this, the centralized voltage-holding device 16 is capable of measuring an actual hold time $T_e$ and of comparing the actual hold time with the theoretical hold time $T_t$, which was previously received by the monitoring computer 101, by means of comparison means 18 included in the centralized voltage-holding device.

In other words, the hold is applied to the start-up device 4 as soon as the controlled relay 10 is switched. As soon as the actual time $T_e$ is greater than or equal to a theoretical hold time $T_t$, the control unit 100 no longer authorizes implementation of the hold. The actual hold time $T_e$ is calculated from the moment when the controlled relay 10 is switched.

An instruction is formulated by the monitoring computer 101, on the basis of the life phase of the internal combustion engine 2 and the theoretical hold time $T_t$, in order to authorize or prohibit the use of the centralized voltage-holding device 16 for detecting an under voltage, which would have the effect of triggering a switching of the controlled relay 10. In fact, the life phases of the internal combustion engine 2, during which the centralized voltage-holding device 16 is activated, correspond to the first start-up phase of the internal combustion engine 2.

It should be noted that the method of the present invention is capable of being implemented by taking into account only two data items 13, 13'; 13, 13"; 13', 13" chosen from the three data items 13, 13', 13" mentioned above.

According to the second mode, the switching of the controlled relay 10 is capable of being forced, and in this case, the theoretical hold time $T_t$ is constant and is fixed arbitrarily. Indeed, in the case where the second controlled relay 10' is damaged, and/or following an Operations Safety test commonly referred to as an "SDF" test, which is conducted after driving, a choice can be made to force the switching operation during the next start-up of the vehicle. In that case, the value of the theoretical hold time $T_t$ is arbitrarily set at a constant value.

To illustrate, the theoretical hold time $T_t$ obtained by the applicant is between 0.2 seconds and 6 seconds.

In the case where the theoretical hold time $T_t$ is zero, the centralized voltage-holding device 16 is not authorized to switch the set of supercapacitors 9, because the start-up authorization will prohibit switching. That is, the holding device 16 is not authorized to close relay 10 and open relay 10'. An improvement is made by using a single data flow, namely the theoretical hold time $T_t$; thus, if the centralized voltage-holding device 16 receives information comprising a zero hold time, the centralized voltage-holding device 16 prohibits switching.

The use of a "LIN" bus ("Local Interconnect Network"), as a medium of communication between the monitoring computer 101 of the engine 17 and the centralized voltage-holding device 16 enables the aforesaid method to be further improved. Indeed, since the "LIN" bus is sensitive to the under voltage, communication can be cut-off when the start-up operation is initiated. In this way, if the actual hold time $T_e$ were measured by the monitoring computer 101, the latter would not systematically be able to indicate to the centralized voltage-holding device 16 that the actual hold time $T_e$ had been exceeded, if the "LIN" communication were cut-off. This is why the actual hold time $T_e$ is measured by the centralized voltage-holding device 16.

As a result of these arrangements, the centralized voltage-holding device 16, which is commonly used as part of a "Stop & Start" device, is advantageously used during the restart phase to improve a first start-up phase of the internal combustion engine 2, by implementing a method that best distributes the steps comprising same, between the centralized voltage-holding device 16 and the monitoring computer 101, the latter preferably forming an integral part of a multifunction engine computer of the motor vehicle 1.

The invention claimed is:

1. A method for controlling a start-up device for an internal combustion engine of a motor vehicle, the start-up device comprising an electric starter operatively connected to the internal combustion engine and an electrical power supply network; the electrical power supply network including an electric power source and a voltage holding device; the voltage holding device comprising a supercapacitor, a relay and a controller; said controller selectively switching said relay in response to the detection of an undervoltage condition between an open state in which the supercapacitor is isolated from the network and a closed state in which the supercapacitor is connected in series with the electric power supply; the method comprising:

(a) a step of monitoring at least two of (1) the temperature $\theta_{em}$ of the engine water, (2) the state of charge E of the electrical power supply source for the internal combustion engine, and (3) the temperature $\theta_s$ of the electrical power supply for the internal combustion engine to determine if an undervoltage condition exists;

(b) a step of electronically determining a theoretical hold time $T_t$ during which the relay is in its closed state; and (3) closing the relay for the theoretical hold time if an undervoltage condition is detected; and (c) controlling said relay to close said relay when an undervoltage condition is detected to detected to support the power source during a start-up or a restart of the internal combustion engine;

said step of determining the theoretical hold time $T_t$ comprising:

(1) sensing at least two of (1) the temperature $\theta_{em}$ of the engine water, (2) the state of charge E of the electrical power supply source for the internal combustion engine, and (3) the temperature $\theta_s$ of the electrical power supply for the internal combustion engine;

(2) electronically calculating at least two of:
  a first intermediate hold time $T_i$ determined as a function of the temperature $\theta_{em}$ of the engine water;
  a second intermediate hold time $T_{i'}$ determined as a function of the state of charge E of the electrical power supply source for the internal combustion engine; and
  a third intermediate hold time $T_{i''}$ determined as a function of the temperature $\theta_s$ of the electrical power supply source for the internal combustion engine; and (3) comparing the at least two calculated intermediate hold times to identify the longest of the at least two intermediate hold times, and setting the theoretical hold time to the longest of the at least two calculated intermediate hold times.

2. The method according to claim 1, wherein the step for calculating the theoretical hold time $T_t$ includes calculating all three of the intermediate hold times $T_i$, $T_{i'}$, and $T_{i''}$, and comparing the three intermediate hold times to determine the longest of the intermediate hold times.

3. The method according to claim 1, wherein the method includes an additional step of comparing the theoretical hold time $T_t$ to an actual hold time $T_e$, the actual hold time $T_e$ being measured by the centralized voltage-holding device.

4. The method according to claim 3, wherein the method includes a final step comprising:
  authorizing a hold if and only if the actual hold time $T_e$ is less than the theoretical hold time $T_t$; and
  prohibiting the hold if and only if the actual hold time $T_e$ is greater than or equal to the theoretical hold time $T_t$.

5. The method according to claim 1, wherein the theoretical hold time $T_t$ is constant.

* * * * *